US009729927B2

(12) United States Patent
Nichols

(10) Patent No.: US 9,729,927 B2
(45) Date of Patent: Aug. 8, 2017

(54) SYSTEMS AND METHODS FOR GENERATING SHADOWS FOR A MEDIA GUIDANCE APPLICATION BASED ON CONTENT

(71) Applicant: Rovi Guides, Inc., Santa Clara, CA (US)

(72) Inventor: Michael R. Nichols, La Canada Flintridge, CA (US)

(73) Assignee: Rovi Guides, Inc., San Carlos, CA (US)

( * ) Notice: Subject to any disclaimer, the term of this patent is extended or adjusted under 35 U.S.C. 154(b) by 188 days.

(21) Appl. No.: 14/528,630

(22) Filed: Oct. 30, 2014

(65) Prior Publication Data

US 2016/0127762 A1  May 5, 2016

(51) Int. Cl.
| | |
|---|---|
| H04N 5/445 | (2011.01) |
| H04N 21/4545 | (2011.01) |
| H04N 21/472 | (2011.01) |
| H04N 21/431 | (2011.01) |
| H04N 21/482 | (2011.01) |
| H04N 21/81 | (2011.01) |

(52) U.S. Cl.
CPC .  *H04N 21/45452* (2013.01); *H04N 21/47202* (2013.01); *H04N 21/47205* (2013.01); *H04N 21/47211* (2013.01); *H04N 21/4821* (2013.01); *H04N 21/4823* (2013.01); *H04N 21/4312* (2013.01); *H04N 21/482* (2013.01); *H04N 21/8153* (2013.01)

(58) Field of Classification Search
CPC ............. H04N 21/4312; H04N 21/482; H04N 21/8153

USPC ..................................................... 725/39, 40
See application file for complete search history.

(56) References Cited

U.S. PATENT DOCUMENTS

| | | | |
|---|---|---|---|
| 6,552,481 B2 * | 4/2003 | Furusawa ............... | H01J 29/07 313/407 |
| 6,608,910 B1 * | 8/2003 | Srinivasa ........... | G06K 9/00362 382/100 |
| 7,764,286 B1 * | 7/2010 | Kumar .................... | G06T 11/00 345/418 |
| 9,123,272 B1 * | 9/2015 | Baldwin ................ | G09G 3/003 |
| 9,154,845 B1 * | 10/2015 | Abboa-Offei ...... | H04N 21/4788 |
| 2010/0192178 A1 * | 7/2010 | Candelore ............. | G06K 9/325 725/39 |
| 2011/0119709 A1 * | 5/2011 | Kim ..................... | H04N 13/004 725/39 |
| 2011/0131610 A1 * | 6/2011 | Lee ................ | H04N 21/234318 725/48 |

(Continued)

*Primary Examiner* — Pankaj Kumar
*Assistant Examiner* — Sahar Baig
(74) *Attorney, Agent, or Firm* — Ropes & Gray LLP

(57) ABSTRACT

Systems and methods for generating shadows for a media guidance application are provided. A display of a media asset is generated that includes a media object with a shadow at an object shadow position. Object shadow information is stored corresponding to the shadow of the object and the object shadow position. In response to receiving a user request to access a media guidance application, a media guidance application display corresponding to the user request is selected. A guide shadow is generated based on the stored object shadow information and the media guidance application display. The guide shadow is combined with the media guidance application display for display to the user.

18 Claims, 6 Drawing Sheets

(56) References Cited

U.S. PATENT DOCUMENTS

2014/0187318 A1* 7/2014 Gallizzi ............... A63F 13/355
 463/31
2015/0215623 A1* 7/2015 Sanders ............... H04N 5/2351
 375/240.08

* cited by examiner

SYSTEMS AND METHODS FOR GENERATING SHADOWS FOR A MEDIA GUIDANCE APPLICATION BASED ON CONTENT

BACKGROUND

In conventional systems, media guidance applications present information about media assets that are available. However, while data provided by the applications reflect content being consumed, the graphical components of such media guidance applications are not influenced by the content the users consume.

SUMMARY

Accordingly, methods and systems are disclosed herein for generating shadows for a media guidance application based on content.

In some embodiments, a display is generated of a media asset that includes a media object with a shadow at an object shadow position. The media asset may be a video that includes a plurality of frames. The video may include an object, such as an actor, character, props or background scenery. A light source may shine light on the object at some angle relative to the object resulting in an object shadow at an object shadow position (e.g., a location and orientation on the screen in the frame relative to the object). Object shadow information corresponding to the shadow of the object and the object shadow position may be stored. For example, a vector representing a magnitude and direction of the object shadow may be computed and stored.

The object shadow information may be updated as the object shadow changes across different frames of the media asset. In some implementations, the object shadow information may be looked up ahead of a current play position in the media asset (e.g., 20 frames or a predetermined number of frames ahead of the current frame). Object shadow information based on future frames may be determined based on a video of the media asset stored locally or remotely on a server. The shadow information that is stored may be updated based on the future play position (e.g., future frames).

In some embodiments, a user request to access the media guidance application may be received. For example, the user may request to access a guide display of media asset listings (e.g., a grid display or browse display). The request may instruct the system to present the requested display as an overlay on top of the media asset or in a separate screen. In response to receiving the request to access the media guidance application, a media guidance application display corresponding to the user request may be selected. For example, the request may be to view media asset listings in a time-channel grid display. In such circumstances, a media guidance application display that includes the time-channel grid may be selected and populated with the corresponding media asset listings information.

In some embodiments, a guide shadow may be generated based on the stored object shadow information and the selected media guidance application display. In some implementations, a guide shadow may be generated by creating a copy of a shape of the selected guidance application display. The object shadow vector may be retrieved from the stored object shadow information to identify a position, orientation, and relative size for the guide shadow. Specifically, the vector may indicate a direction for the guide shadow to be positioned relative to the guide display. The system may determine the coordinates of where the guide display will be displayed on the screen and position the guide shadow relative to those coordinates based on the direction indicated by the object shadow vector.

In some embodiments, the guide shadow may be combined with the media guidance application display for display to the user. In some implementations, the system may determine a magnitude of the object shadow vector. The magnitude may represent the size of the object shadow relative to the object in the screen. The system may determine how much of the guide shadow to overlap by the media guidance application display based on the determined magnitude. In some implementations, the system may overlap less of the guide shadow by the guidance application display as the magnitude is increased.

In some embodiments, the combined guide shadow with the media guidance application display may be presented to the user separately or together with the corresponding media asset having the object and object shadow. In some embodiments, a simultaneous display of the media object with the shadow and the combined guide shadow with the media guidance application display is generated such that the guide shadow appears at a same angle as the shadow of the media object. In some embodiments, the guide shadow is dynamically adjusted based on changes in the shadow of the object as playback of the media asset progresses.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are disclosed herein for generating shadows for a media guidance application based on content. In particular, information pertaining to a shadow of a media object in a media asset is stored. When a user requests access to the media guidance application, a display of the media guidance application is selected and a media guidance application display shadow (herein referred to as a "guide shadow" or "media guide shadow") is generated based on the stored information pertaining to the media object shadow. A display that combines the media guidance application display with the guide shadow is generated for presentation to the user.

With reference to media assets or content, the amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application, media guide application, guide application, or a guidance application.

Figure 6:
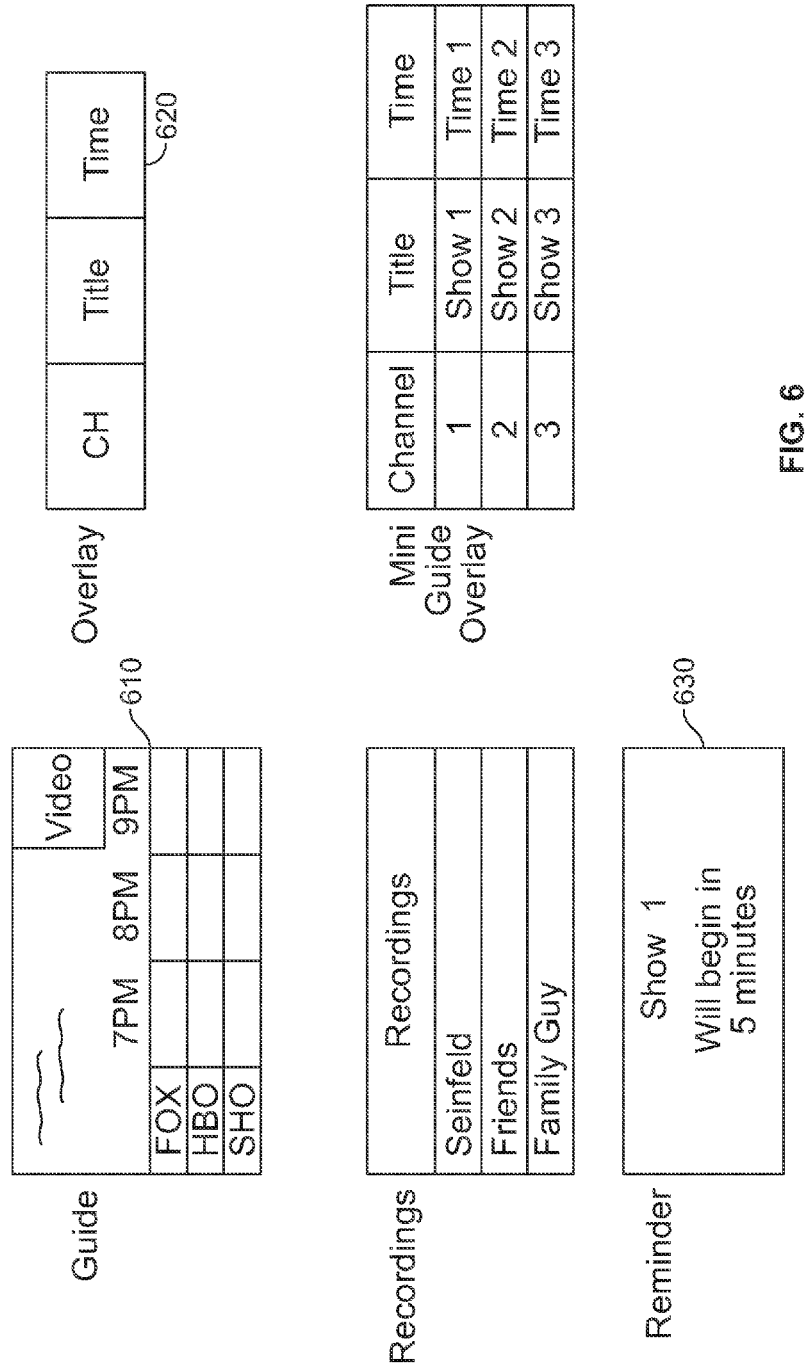
FIG. 6 shows illustrative displays of a media guidance application in accordance with some embodiments of the disclosure.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. These graphical user interface screens are referred to as displays of the media guidance application. Examples of graphical user interface screens generated by interactive media guidance applications are shown in FIG. 6.

Media guidance application displays 600 may include a grid display 610 that may be the same or similar to the display screens shown and described below in connection with FIGS. 1-2. Each of display 600 may be different in shape and/or size. Displays 600 represent visual templates that the guidance application uses to populate using guide data that is received (e.g., program listings). Displays 600 may include an overlay 620 that may provide information (e.g., channel or content source, title and transmission time) about a currently presented media asset. Overlay 620 may be presented on top of the media asset being accessed. Displays 600 may include a reminder display 630. Reminder display 630 may be presented as an overlay or in its own screen. Reminder display 630 may inform a user about an upcoming transmission of a media asset or about a previously recorded media asset. Each of display 600 may be interactive to allow a user to select between various options or media listings presented in displays 600. Although the shapes of the guidance application displays are shown to be rectangular, it should be understood that displays 600 may be any other suitable shape (e.g., circles, squares, triangles, or any other geometric shape).

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

A user may request access to any of displays 600 using a suitable input device (e.g., remote control, touch screen, voice input, etc.). The input device may have a dedicated button to reach each of the different displays 600. For example, a GUIDE button may allow a user to request access to guide display 610. An INFO button may allow a user to request access to an information overlay 620. A REMINDERS button may allow a user to request access to reminders display 630. Alternatively or in addition, one display may allow a user to request access to another display. For example, a user navigating through guide display 610 may select a given media listing (e.g., using a SELECT button). Such a selection may result in the media guidance application receiving a request to access a guide display with information about the media asset corresponding to the selected media listing.

The media guidance application and/or any instructions for performing any of the embodiments discussed herein may be encoded on machine or computer readable media. Machine or computer readable media includes any media capable of storing data. The machine or computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), subtitles, media format (e.g., standard definition, high definition, 3D, etc.), advertisement information (e.g., text, images, media clips, etc.), on-demand information, blogs, websites, and any other type of guidance data that is helpful for a user to navigate among and locate desired content selections. As discussed above, displays 600 may represent templates that the media guidance application uses to populate based on the guidance data.

Figure 1:
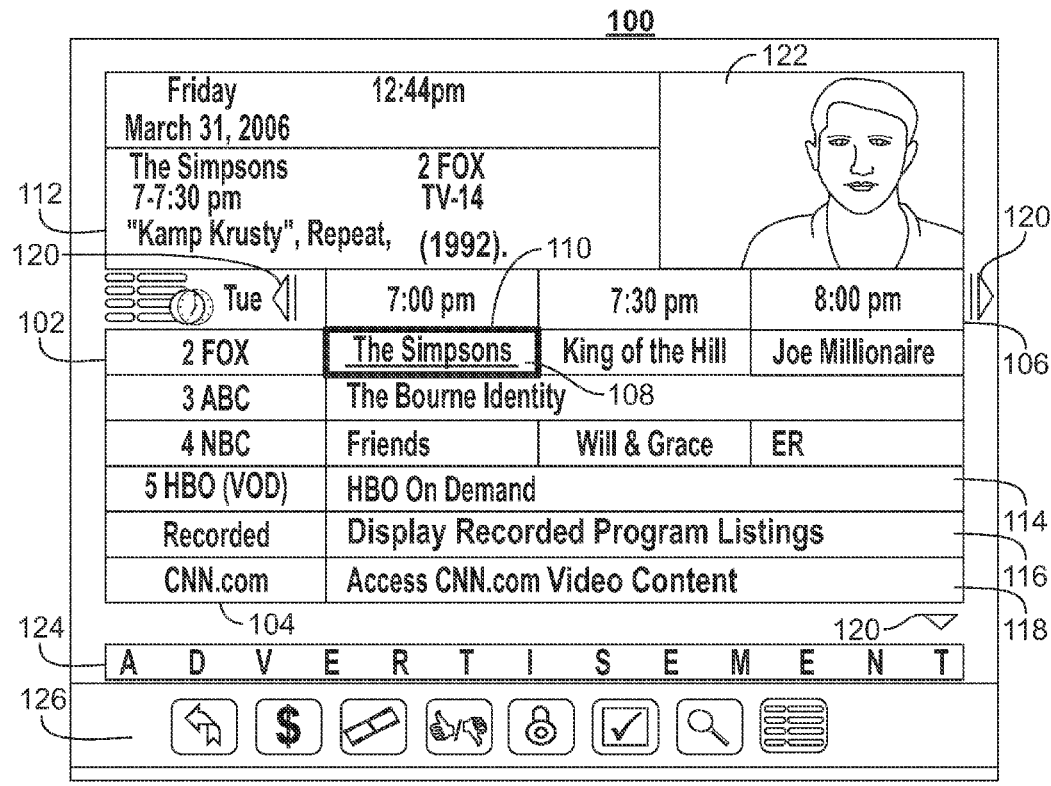
FIGS. 1 and 2 show illustrative display screens that may be used to provide media guidance application listings in accordance with an embodiment of the disclosure.
Figure 2:
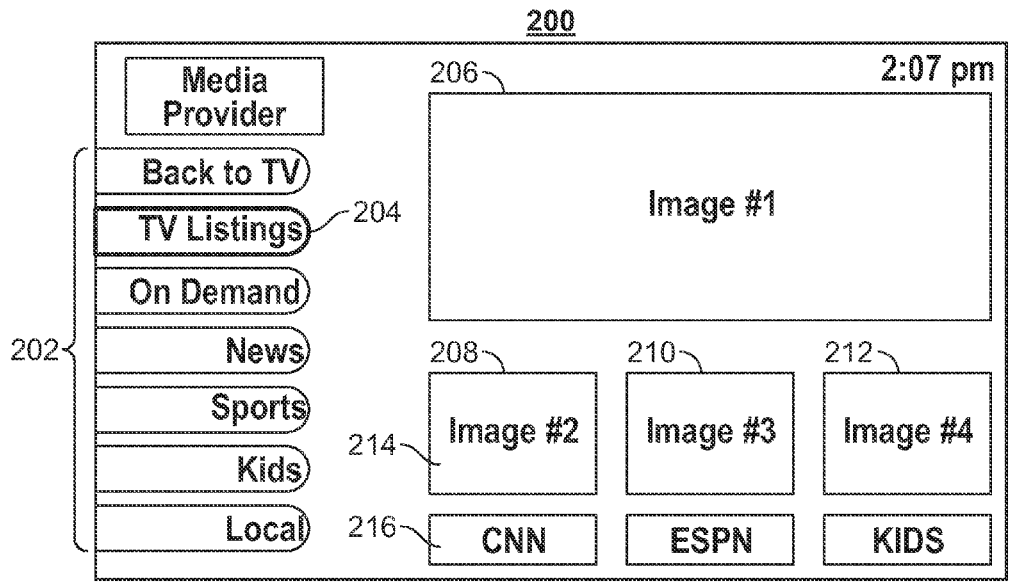

FIGS. 1 and 2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information. In some embodiments, a guide shadow may be presented for grid 102. In such circumstances, the position and/or size and shape of the shadow may vary based on which program listings are highlighted and/or selected by the user. Specifically, the media guidance application may monitor the media asset corresponding to a program listing that is highlighted to identify a media object and shadow. The media guidance application may update stored object shadow information based on the highlighted or selected listing. The media guidance application may then update the guide shadow of grid 102 to reflect the position and/or orientation of the object shadow of the object in the media asset corresponding to the highlighted or selected program listing.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed (e.g., using the same or other media guide displays) in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays (e.g., displays 600), and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, a subtitles setting, or other features. Options available from a main menu display may include search options, VOD options, parental control options, Internet options, cloud-based options, device synchronization options, second screen device options, options to access various types of media guidance data displays, options to subscribe to a premium service, options to enable/disable the subtitles setting, options to edit a user's profile, options to access a browse overlay, or other options. Depending on the option selected, the media guidance application may select the appropriate one of the media guidance displays 600. For example, selection of browse overlay option may result in a request to access browse overlay 620. Accordingly, the media guidance application may select overlay 620 as the template used to populate with guide data when the browse overlay option is selected. Similarly, when the request to access the media guidance application includes a GUIDE option, the media guidance application may select guide 610 as the template used to populate with guide data. The media guidance application may then present the selected template populated with the guide data to the user.

In some embodiments, the media guidance application may present the populated template with a guide shadow. Guide shadows may be provided or generated for every one of guide displays 600 or only some of guide displays 600. The media guidance application may compute a size and shape of the selected guidance application display template. The media guidance application may retrieve stored object shadow information from storage 308 (e.g., including a media object shadow size and position represented as a vector). The media guidance application may generate a guide shadow (e.g., a graphical component) that matches the shape of the selected guidance application display template and that has a size that corresponds to the shadow size. For example, the object shadow information may indicate that the object shadow size corresponding to the media object is 50 percent smaller than the media object. Accordingly, the size of the guide shadow may be 50 percent smaller than the size of the selected guidance application template. The guide shadow may be opaque, translucent, and/or partially translucent.

The media guidance application may compute an angle of the object shadow based on the stored vector. For example, the media guidance application may determine that the object shadow is angled towards the bottom right corner of a screen. The media guidance application may position the guide shadow at substantially the same angle (towards the bottom right corner of a screen) as the object shadow. The media guidance application may combine the populated template with the shadow and present the combined image to the user. In some implementations, the combined image may be presented together with the media asset and media object that corresponds to the stored object shadow information. For example, the guidance application display with the guide shadow may be presented as an overlay on top of the media asset. In circumstances where the guide shadow is translucent or partially translucent, the portion of the media asset overlaid by the guide shadow may appear through the guide shadow (at least partially). As a result, the portion of the media asset that appears through the guide shadow may appear darker or more opaque than other portions of the media asset that are not overlaid by the guidance application display or shadow.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. For example, the user may specify whether guide shadows are opaque or partially or fully translucent. The user may specify the percentage of translucency the guide shadows have. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

In some embodiments, user profile information may include biometric state and/or emotional state information. For example, the user profile may include associations of biometric states and emotional states with different categories of information based on user interactions with an application. For example, a media guidance application may store a profile of user interactions with action movies when the user is in an angry emotional state and store a profile of user interactions with drama movies when the user is in a depressed emotional state. The media guidance application may provide recommendations based on a determined biometric state and/or emotional state of a user and the stored user profile. In some embodiments, user profile information may include external components in the home of the user. For example, the user profile information may identify each external component in the user's home or each external component that is associated with the user and may include a communication address (e.g., IP address, e-mail address, etc.) associated with each component. The user equipment device may use the communication address of each external component to monitor the external component and receive status information pertaining to the component.

Another display arrangement for providing media guidance is shown in FIG. 2. Video mosaic display 200 includes selectable options 202 for content information organized based on content type, genre, and/or other organization criteria. Selection of option 204 may return the user to grid 102 (FIG. 1).

In display 200 listings 206, 208, 210, and 212 may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210 and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
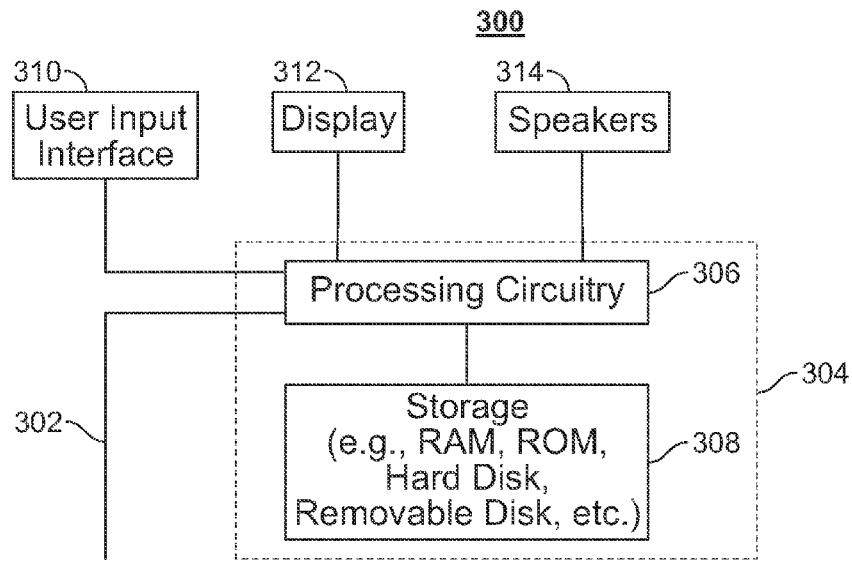
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306, detecting circuitry 320 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Control circuitry may also instruct detecting circuitry 320, which can be used to detect and/or identify a user or users without requiring the user or users to make any affirmative actions by using any suitable biometric determination technique, such as facial determination, brainwave information, body temperature determination, heart rate determination, odor determination, scent determination, body shape determination, voice determination, behavioral determination, and any other suitable biometric determination technique or any combination thereof.

Detecting circuitry 320 may include monitoring component 316 and power management unit 318. Monitoring component 316 may include one or more components (e.g., an EEG, EMG, pulse oximeter, etc.) for monitoring an activity type (e.g., biometric state, location, or brainwave information) of a user. As referred to herein, "location" refers to any relative or absolute identifier of a position, such as a geographical coordinate, vector for direction, street address, name of building, or any other suitable identifier. For example, a location may be indicated by coordinates in a geographic coordinate system (e.g., latitude or longitude), or a global positioning system (GPS).

It should be noted that monitoring component 316 may, in some embodiments, be located on a separate device in communication with the device upon which a media guidance application (and control circuitry 304) is implemented. For example, in some embodiments, monitoring component 316 may communicate with device 300 via a communications network (e.g., communications network 414 (FIG. 4)). In some embodiments, monitoring component 316 may be a wearable device (e.g., a wristband, headband, watch, etc.).

In some embodiments, monitoring circuitry may monitor the brain activity of a user. Monitoring component 316 may transmit updates (e.g., associated with brain activity) of a user to control circuitry 304. Control circuitry 304 may compare the updates to data related to brain activity (e.g., threshold ranges, frequency ranges, etc.) of the user and/or other users stored on storage 308 (e.g., to determine whether or not the brain activity of the user corresponds to a particular threshold range and/or mood, attentiveness level, activity type, a subtitles setting, etc.).

In some embodiments, monitoring component 316 may include one or more of a temperature sensor, a pulse oximeter, a motion sensor, an accelerometer, an optical sensor, or any other suitable sensor for determining a biometric state of a user. Monitoring component 316 may include any suitable hardware and/or software to perform biometric detection and determination operations. For example, monitoring component 316 may include infrared, optical, and/or radio-frequency receivers and/or transmitters. Monitoring component 316 may additionally, or alternatively, include one or more microphones and/or cameras to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information.

In some embodiments, detecting circuitry 320 may additionally, or alternatively, include palm, fingerprint, and/or retinal readers for detecting and/or identifying users based on biometric information about a user. In some embodiments, detecting circuitry may communicate to processing circuitry 306 and/or storage 308 various detection and/or identification mechanisms indicating whether a user is detected and/or identified at a particular device.

As referred to herein, the term "biometric state" should be understood to mean a metric or measure indicative of a physiological state of a user, such as measurements of chemical content in body fluids (e.g., salt electrolyte concentration in perspiration, blood alcohol level, hormonal levels in blood, glucose level in blood, oxygen content of blood), measurements of circulation (e.g., pulse, heart rate), body temperature, brain activity (e.g., measured via electroencephalograms), or any other suitable measurements. As referred to herein, the term "emotional state" should be understood to mean a metric of measure indicative of a psychological state or mental state of a user, such as angry, sad, depressed, happy, agitated, bored, or any other suitable state.

For example, using an infrared camera and light source, processing circuitry 306 may generate a three-dimensional map of an area. A plurality of IR beams may each be modulated and encoded to be distinguishable, transmitted from the IR light source and directed at various points in an area. Each of the beams may reflect off objects in the room back towards the camera. Depending on the distance traveled by each light beam, the time of flight, or time traveled by each light beam, may vary. If the IR camera and light source are placed side by side, travel time of the light beam may correlate to the distance of an object from the light source and camera. The time of flight may be measured as the time between transmission of the encoded beam from the light source and detection of the encoded beam at the camera. By correlating the time of flight of beams, and the initial direction of the beam, processing circuitry 306 and/or detecting circuitry 320 may generate the three-dimensional map of the area. Based on the three-dimensional map, control circuitry 304 may detect and identify distinct bodies of users, and determine distance of the body from the biometric device. Using color cameras and face detection, control circuitry 304 may detect or identify users.

Using microphones and voice recognition, control circuitry 304 may detect or identify users based on the physical characteristics of their vocal tract through voice recognition or identification. Using a sound source and an array of microphones, control circuitry 304 may determine information about the shape of the area surrounding the biometric device through acoustic localization, similar to the time-of-flight method described above in reference to IR light. For example, a sound source may be located near an array of microphones. A sound broadcast from the sound source may propagate as a wave front away from the source. As the wave front impacts an object, portions of the wave front may be reflected toward the sound source and array of microphones. Depending on the position of the object, the reflected sound may arrive at the microphone at different times. For example, the reflected sound may arrive at a closer microphone in a shorter amount of time than it arrives at a farther microphone. Based on the time or phase difference in arrival time at various microphones, total travel time of the sound, and positions of the microphones, it may be possible to generate a spatial areal map. Location of objects may be determined based on the spatial areal map generated via acoustic localization, IR time of flight, and any other suitable mapping method, or any combination thereof. It should be understood that various biometric techniques and devices may be used alone, or in combination, to supplement each other to more accurately identify or detect users.

In some embodiments, voice recognition may be used to determine biometric and/or emotional states. For example, voice recognition may be performed on the speech of a user to find words spoken during certain biometric states. Detecting circuitry 320 or control circuitry 304 may correlate spoken words and other biometric states such as heart rate and body temperature for storage in cross-referencing databases. Analysis and correlation of vocal tones may also be performed.

In some embodiments, detecting circuitry 320 may use any suitable method to determine the distance, trajectory, and/or location of a user in relation to an electronic device. The electronic device may also use, for example, triangulation and/or time-difference-of-arrival determination of appropriate information to determine a user's location in relation to an electronic device. For example, time-difference-of-arrival values of sounds emanating from a user may be determined. In some embodiments, any suitable image processing, video processing, and/or computer vision technique may be used to determine a user's distance, trajectory, and/or location in relation to an electronic device. A user's distance, trajectory, and/or location in relation to an electronic device may be determined using any suitable method.

In some embodiments, detecting circuitry 320 and/or control circuitry may conduct analysis on information from one or more monitoring components 316 to determine gestures. For example, movements of a hand, detected by an accelerometer worn on a wrist of a user may be used to determine gestures at certain points in time. The gestures may be correlated with other biometric states, brainwave information, location information, and/or emotional states to determine whether to enable/disable the subtitles setting.

In some embodiments, processing circuitry 306 may determine a location based on global positioning system (GPS) measurements, or, in the case of cellular telephones, measurements based on cell-tower signals, done by detecting circuitry 320. Processing circuitry 306 may use these measurements to determine location coordinates, which may be transmitted to other electronic devices.

In some embodiments, detecting circuitry may be used to identify a user based on a determined biometric state or biometric information about the user. An identified user may refer to a user who may be recognized sufficiently by a device to associate the user with a user profile. In some embodiments, the user may be associated with a group of users, as opposed to, or in addition to, being associated with a unique user profile. For example, the user may be associated with the user's family, friends, age group, sex, and/or any other suitable group. A detected user may refer to a user whose presence is detected by a device, but who is not yet identified by the device.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. For example, storage 308 may be used to store object shadow information (e.g., object shadow size, orientation, position, angle, etc.). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays (including guide shadows) discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
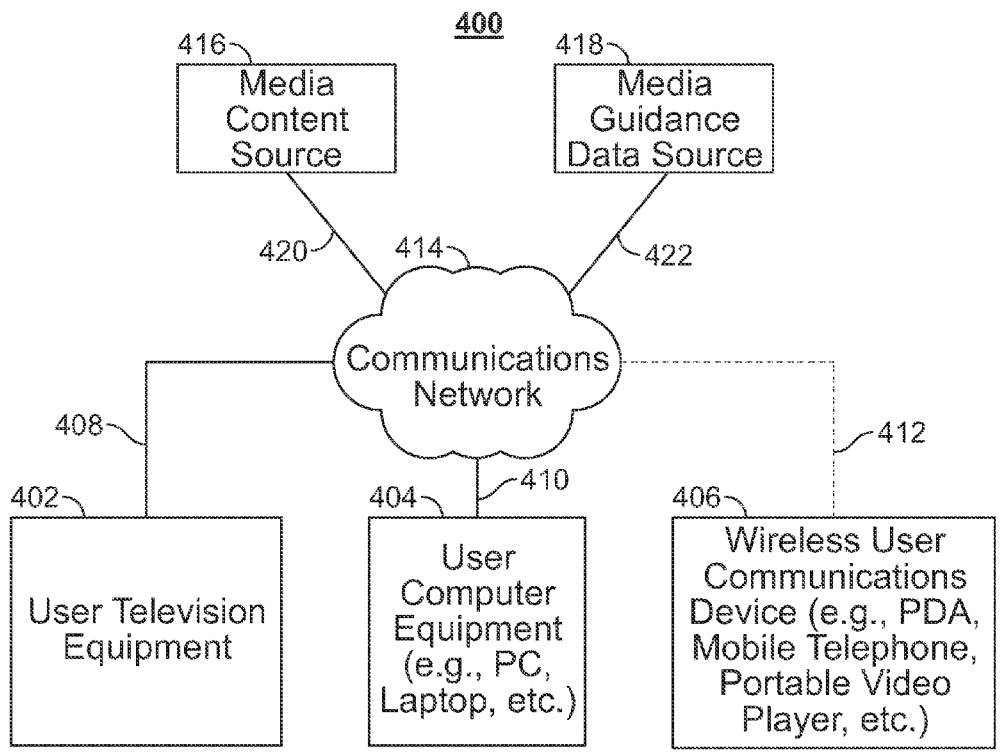
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device. In some embodiments, guide shadows presented with guidance application displays on a second screen device may correspond to media object shadows that were presented on another device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, in-home network, mobile voice or data network (e.g., a 4G, XLTE, and/or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Paths 412 are drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices and components may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data.

Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, wireless user communications device 406 may include wearable devices (e.g., monitoring component 316) that are positioned on a user. For example, wireless user communications device 406 may include smart eyewear, smart watches, any other suitable user device that is wearable, or any combination thereof. The type of wearable device may affect the type of biometric state that can be determined. For example, a wearable headset device may include electrodes as part of monitoring component 316 and may be able to determine and monitor brain activity of a user. For example, a wearable ring device may include a temperature sensor to detect body temperature and may include a pulse oximeter to determine a pulse rate and a blood oxygen level.

In some embodiments, guide shadows may be generated for display with a media guidance application display based on content that is being presented. For example, the media guidance application may identify an object (e.g., an actor or background) that is presented in a video of a media asset. The media guidance application may determine whether the object has a shadow in the video. In response to determining that the object has a shadow, the media guidance application may store shadow information for the shadow that indicates a relative size of the shadow, angle and/or direction. The media guidance application may update the stored shadow information as the video progresses. In response to receiving a user request to access the media guidance application (e.g., a display showing listings), the media guidance application may generate a shadow for the media guidance application display based on the stored shadow information. The media guidance application may add the generated guide shadow to the media guidance application display and present them together. In some embodiments, the combined display of the guidance application display and guide shadow may be presented with the video that includes the object and shadow corresponding to the stored shadow information.

Figure 5:
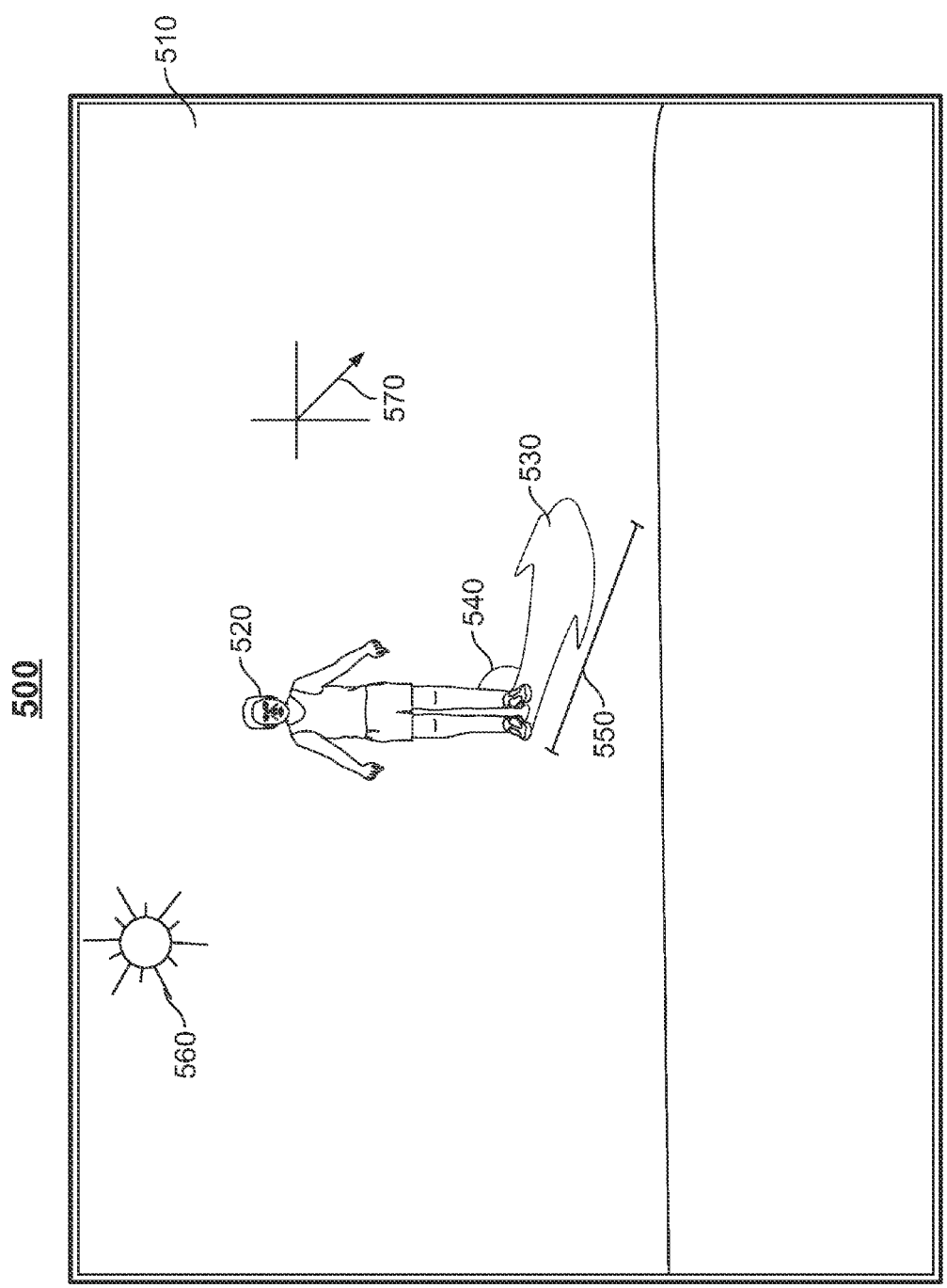
FIG. 5 is an illustrative display of a media asset with a media object shadow in accordance with some embodiments of the disclosure.

FIG. 5 is an illustrative display 500 of a media asset with a media object shadow in accordance with some embodiments of the disclosure. Display 500 may include a media asset 510 (e.g., an image or a video), an object 520 (e.g., an actor or background scenery), an object shadow 530 and a light source 560. Object shadow 530 may be the result of light source 560 shining light on object 520. Light source 560 may or may not be present in display 500.

In some embodiments, the media guidance application may store shadow information for shadow 530 of object 520. Shadow information may be stored in storage 308 and may include relative size information, position, direction and location of shadow 530. In some implementations, the shadow information may be stored and represented as a shadow vector 570 (e.g., a vector that indicates magnitude and direction of shadow 530). In some implementations, the media guidance application may compute the relative size information (e.g., the magnitude of the shadow vector) for shadow 530 based on a ratio of a length 550 of shadow 530 to a height of object 520. For example, if the height of object 520 is four and length 550 of shadow 530 is two, the computed ratio may be one-half. Specifically, the ratio may represent that shadow 530 of object 520 in the given frame of media asset 510 is half of the height. When the shadow information indicates the ratio is one-half, the media guidance application may generate the guide shadow for a guidance display that is half of the size of the guidance display.

In some embodiments, the media guidance application may compute a position, direction and location of shadow 530 (e.g., the angle of the shadow vector). For example, the media guidance application may determine an angle 540 of shadow 530 relative to a reference axis (e.g., horizontal or vertical axis) of the display screen. The media guidance application may also determine the direction of shadow 530 relative to a reference axis (e.g., horizontal or vertical axis) of the display screen). For example, the media guidance application may determine that shadow 530 is at a 30 degree angle relative to the horizontal axis of the screen pointing towards the bottom right of the display screen.

In some embodiments, multiple shadows may be present in a given frame of media asset 510. In such circumstances, if multiple objects and corresponding shadows are present in media asset 510, the media guidance application may compute an average or representative shadow information for each of the corresponding shadows and store the representative shadow information in storage 308. Shadow vector 570 may represent the computed average or representative shadow information of each of the shadows in a given frame of media asset 510.

As media asset 510 progresses in time or play position, object 520 may move around relative to light source 560 and, accordingly, shadow 530 may change in size, direction and angle. Specifically, shadow 530 may change in size, direction and angle across different frames (images) of media asset 510. The media guidance application may update shadow vector 570 (e.g., the shadow information stored in storage 308) to reflect the current shadow 530 size, direction and angle.

In some embodiments, the media guidance application may receive a user request to access the media guidance application. The user request may be received while media asset 510 is presented or after media asset 510 is presented. The user request may be a request to access any display of the media guidance application (e.g., a BROWSE request, a GUIDE request, an INFO request). Specifically, the user request may request a display of any of the media guidance application displays discussed in connection with FIG. 6.

In response to receiving the user request to access the media guidance application, the media guidance application may identify one of a plurality of media guidance application displays that correspond to the request. In particular, the media guidance application may select one of the media guidance application display templates shown in displays 600. For example, if the user request includes a request to access a guide (e.g., grid 102), the media guidance application may select grid display template 610. The media guidance application may populate template 610 with corresponding guide information (e.g., program listings). Alternatively, if the user request includes a request to browse listings while viewing media asset 510 (e.g., browse listings in an overlay), the media guidance application may select grid display template 620. The media guidance application may populate template 620 with corresponding guide information (e.g., program listings)

The media guidance application may retrieve the stored object shadow information from storage 308. In particular, the media guidance application may retrieve the stored shadow vector, which includes information about a relative size of the object shadow and positioning. Based on the shadow information, the media guidance application may generate a shadow for the selected media guidance application display. For example, if the media guidance display is a rectangle, the media guidance application may generate a guide shadow that is also rectangular or has a similar shape. The guide shadow may be opaque in color or gray although any other suitable color or shading may be used.

The media guidance application may select a direction and orientation for the guide shadow based on a direction and orientation in the stored shadow vector and a direction and orientation of the guide display. For example, the media guidance application may determine that the direction and orientation of the shadow vector is towards the bottom right portion of the display relative to a center of the media object. Accordingly, the media guidance application may position the guide shadow underneath and to the right of the media guidance application display. Specifically, the media guidance application may determine the coordinates of where the guide display will be displayed on the screen. The media guidance application may position the generated guide shadow relative to the coordinates of the guide display.

In some implementations, the media guidance application may identify the angle of the shadow vector that is stored relative to an axis of the screen (e.g., the horizontal axis). The angle of the shadow vector may indicate that the shadow is pointed below the horizontal axis at a given angle amount and to the positive side of the horizontal axis. Using this information and the coordinates of the guide display, the media guidance application may position the guide shadow on a display screen such that a center of the guide shadow is below a horizontal axis through a center of the guide display at the given angle amount relative to the positive side of the horizontal axis.

In some circumstances, the given angle amount may be less than 45 degrees (e.g., the vector is closer to the positive side of the horizontal axis than the negative side of the vertical axis of the screen). In such cases, the object shadow may appear closer to the horizontal axis on the positive side than the vertical axis on the negative side. Accordingly, the corresponding guide shadow may be generated such that the guide shadow is larger on the right side of the guide display than the bottom side of the guide display. As the shadow vector angle increases relative to the positive side of the horizontal axis towards the negative side of the vertical axis, the object shadow may point more towards the bottom of the media object. Accordingly, the corresponding guide shadow may be generated such that the guide shadow increases in size on the bottom side of the guide display and decreases in size on the right side of the guide display as the shadow vector angle increases relative to the positive side of the horizontal axis towards the negative side of the vertical axis.

In some embodiments, the media guidance application may combine the media guide display and the media guide shadow that was generated based on a relative size of the object shadow that is stored. In particular, the media guidance application may select the amount by which the guide display overlaps the guide shadow based on the relative size of the stored shadow vector. For example, a magnitude of the shadow vector may indicate that the object shadow is half of the size of the object shadow. In such circumstances, the media guidance application may combine the guide display with the guide shadow such that the guide display overlaps half of the guide shadow. In some implementations, the amount by which the guide display overlaps the guide shadow may be inversely proportional to the magnitude of the shadow vector. Specifically, the larger the magnitude of the shadow vector (e.g., the larger the size of the object shadow is to the media object), the less the media guidance application display overlaps the generated guide shadow. The portions of the guide shadow that are overlapped by the guide display may be obscured by the guide display such that only the non-overlapped portions appear in the display screen.

Figure 7:
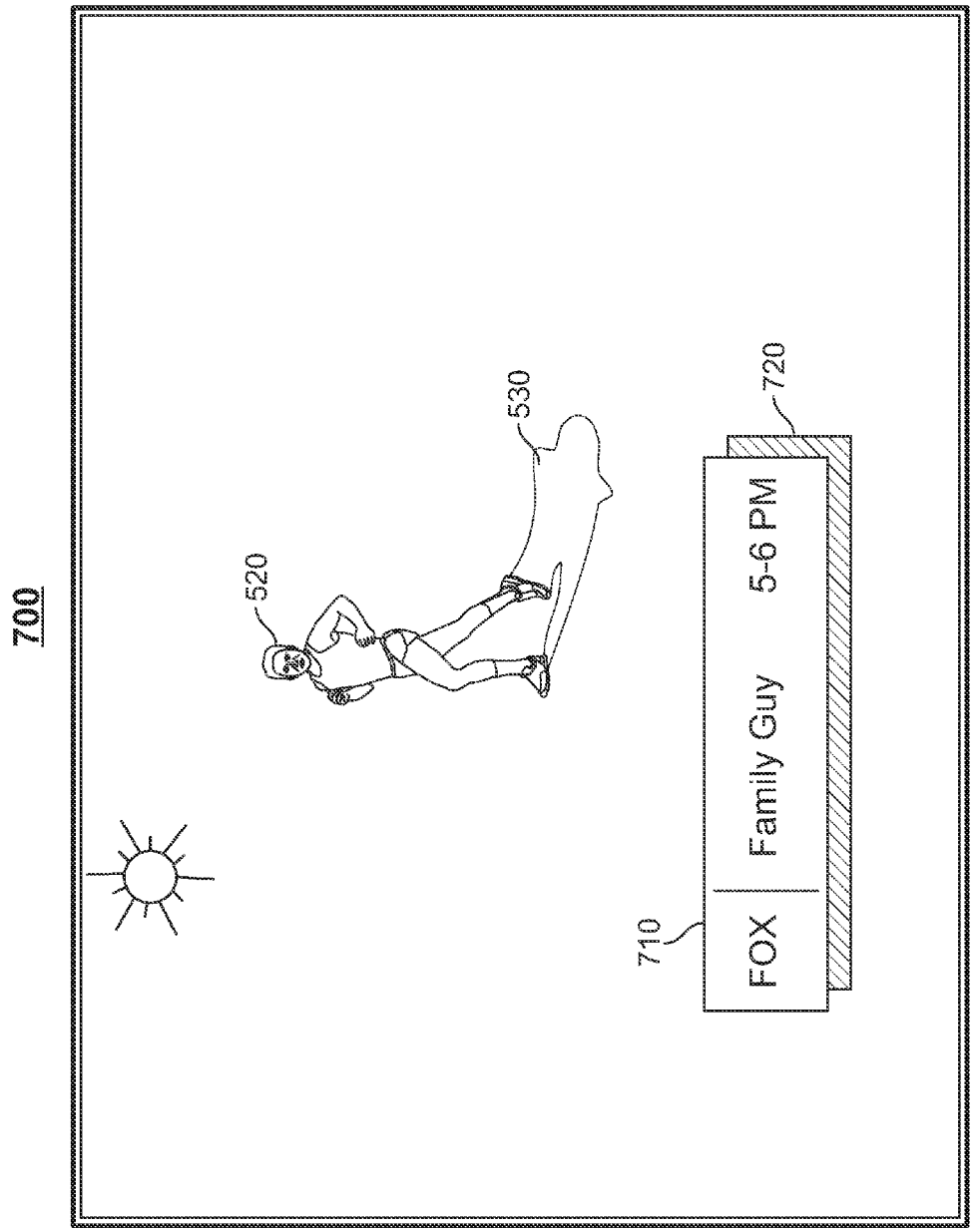
FIG. 7 is an illustrative display of media guidance application shadow in accordance with some embodiments of the disclosure.

In some embodiments, after the guide shadow is combined with the guide display, the media guidance application may present the combined guide display and guide shadow on the screen. FIG. 7 is an illustrative display 700 of media guidance application shadow in accordance with some embodiments of the disclosure. Display 700 includes a media guidance application display 710 to which access was requested and a guide shadow 720. In some implementations, guidance application display 710 and guide shadow 720 may be presented simultaneously with object 520 and object shadow 530 for which the object shadow information was stored. Guide shadow 720 may be positioned relative to guide display 710 complementary to the manner in which object shadow 530 is positioned relative to object 520. Specifically, object shadow 530 may be positioned towards the bottom right side of object 520. Similarly, guide shadow 720 may be positioned towards the bottom right side of guide display 710.

Figure 8:
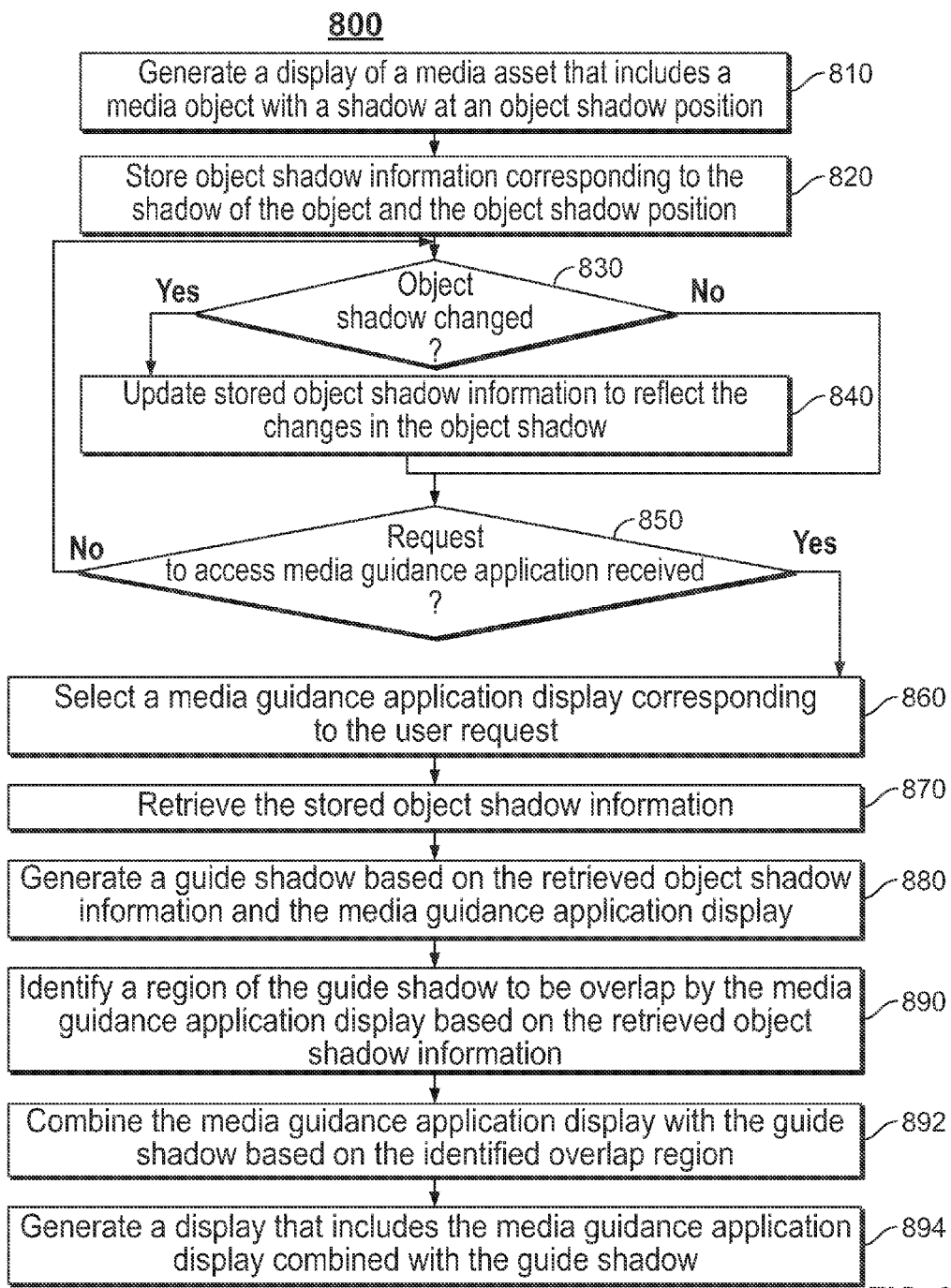
FIG. 8 is an illustrative flow diagram for generating media guidance application shadows based on content in accordance with some embodiments of the disclosure.

FIG. 8 is an illustrative flow diagram 800 of a process for generating media guidance application shadows based on content in accordance with some embodiments of the disclosure. At step 810, a display of a media asset that includes a media object with a shadow at an object shadow position is generated. For example, the media guidance application may generate a display of media asset 510 (FIG. 5). Media asset 510 may include media object 520 and object shadow 530. The position of object shadow 530 may be represented by vector 570.

At step 820, object shadow information corresponding to the shadow of the object and the object shadow position is stored. For example, the media guidance application may compute shadow vector 570 based on shadow object 530 and store shadow vector 570 in storage 308. The media guidance application may also store information about object shadow 530 such as a frame identifier of media asset 510 in which shadow 530 appears, a position, orientation, relative size and/or any other visual properties of shadow 530.

At step 830, a determination is made as to whether the object shadow has changed. In response to determining that the object shadow has changed, the process proceeds to step 840; otherwise the process proceeds to step 850. For example, the media guidance application may compute the shadow vector for each shadow that appears in media asset 510 (e.g., for shadows that appear in subsequent frames of media asset 510). In some implementations, the media guidance application may compute the shadow vector periodically (e.g., after every predetermined number of frames). The media guidance application may compare the current shadow vector with previously stored shadow vector information to determine whether the shadow has changed.

In some embodiments, the media guidance application may look ahead of the current frame at the object shadow location in subsequent frames. For example, the media guidance application may look ahead of the current frame by a predetermined number of frames such that while a user views a current frame the media guidance application may determine the updated object shadow information for subsequent frames. This may reduce delays in generating the combined display of the media guidance application display and the generated guide shadow. Specifically, the media guidance application may perform steps 880, 890 and 892 each time the object shadow information is updated (e.g., based on subsequently received frames) and before receiving a user request to access the media guidance application. As such, when the user request to access the media guidance application is received, the latency in presenting the combined guide display with guide shadow is reduced.

At step 840, the stored object shadow information is updated to reflect the changes in the object shadow. For example, the media guidance application may store the newly computed object shadow vector and corresponding information. In some embodiments, the media guidance application may replace the previously stored shadow information with the newly determined shadow information.

At step 850, a determination is made as to whether a request to access the media guidance application has been received. In response to determining that a request has been received, the process proceeds to step 860; otherwise the process proceeds to step 830. For example, the media guidance application may determine whether a user request to access one of guide screens 600 is received (e.g., a GUIDE button was pressed or INFO button was pressed) (FIG. 6).

At step 860, a media guidance application display corresponding to the user request is selected. For example, the media guidance application may determine which of a plurality of guide templates corresponds to the user request. In particular, the media guidance application may select one of displays 600 based on the user request.

At step 870, the stored object shadow information is retrieved. For example, the media guidance application may retrieve the object shadow vector from storage 308.

At step 880, a guide shadow is generated based on the retrieved object shadow information and the media guidance application display. For example, the media guidance application may generate a guide shadow having a shape that corresponds to a shape of the selected guide display. The media guidance application may position and orient the generated guide shadow based on coordinates of the media guidance application display and the angle information and magnitude of the object shadow information. In particular, if the object shadow information indicates that the object shadow is positioned towards the lower right relative to object 520, the media guidance application may position the guide shadow towards the lower right of the media guidance application display.

At step 890, a region of the guide shadow to be overlap by the media guidance application display is identified based on the retrieved object shadow information. For example, the media guidance application may determine a size of object shadow 530 relative to object 520 based on the stored object shadow information (e.g., a magnitude of the shadow vector). Based on the determined relative size, the media guidance application may identify by how much the media guidance application display should overlap the generated guide shadow. In some implementations, the larger the relative size, the smaller the overlap region such that more of the guide shadow remains visible because it is not overlapped by the media guidance application display.

At step 892, the media guidance application display is combined with the guide shadow based on the identified overlap region. For example, the media guidance application may use an overlay engine to overlay the media guidance application display on top of the guide shadow based on the identified overlap region.

At step 894, a display that includes the media guidance application display combined with the guide shadow is generated. For example, the media guidance application may generate a display of the combined media guidance application display 710 and guide shadow 720 (FIG. 7).

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for generating shadows for a media guidance application, the method comprising:

generating a display of a media asset that includes a media object with a shadow at an object shadow position;

storing object shadow information corresponding to the shadow of the object and the object shadow position; and in response to receiving a user request to access a media guidance application:

selecting a media guidance application display corresponding to the user request;

determining, based on the stored object shadow information, an angle corresponding to the stored object shadow position;

computing, based on the stored object shadow information, a shadow size ratio based on a ratio of a size of the object shadow and a size of the media object;

identifying a shape of the media guidance application display;

generating a guide shadow based on the determined angle, the computed shadow size ratio, the stored object shadow information and the shape of the media guidance application display; and combining the guide shadow with the media guidance application display for display to the user.

2. The method of claim 1 further comprising:

detecting a change in a position of the shadow of the media object; and updating the stored object shadow information including the object shadow position to reflect the detected change in position.

3. The method of claim 1, wherein selecting the media guidance application display comprises:

identifying a media guidance function corresponding to the user request; and retrieving one of a plurality of media guidance application displays that corresponds to the identified function.

4. The method of claim 1, wherein the media guidance application display comprises a plurality of media listings.

5. The method of claim 1 further comprising generating a simultaneous display of the media object with the shadow and the combined guide shadow with the media guidance application display, wherein the guide shadow appears at a same angle as the shadow of the media object.

6. The method of claim 1 further comprising dynamically adjusting the guide shadow based on changes in the shadow of the object as playback of the media asset progresses.

7. The method of claim 1, wherein the media asset is a video and the media object is a character or landscape in the video.

8. The method of claim 1 further comprising retrieving the stored object shadow information in response to receiving the user request.

9. The method of claim 1 further comprising receiving information from a source of the media asset that identifies a position of the shadow of the object at a later play position than a current play position in the media asset, wherein the guide shadow combined with the media guidance application display is presented at the later play position.

10. A system for generating shadows for a media guidance application, the system comprising: storage circuitry configured to store object shadow information corresponding to a shadow of a media object and object shadow position; and control circuitry configured to: generate a display of a media asset that includes the media object with the shadow at the object shadow position; and in response to receiving a user request to access a media guidance application:

select a media guidance application display corresponding to the user request;

determine, based on the stored object shadow information, an angle corresponding to the stored object shadow position;

compute, based on the stored object shadow information, a shadow size ratio based on a ratio of a size of the object shadow and a size of the media object;

identify a shape of the media guidance application display;

generate a guide shadow based on the determined angle, the computed shadow size ratio, the stored object shadow information and the shape of the media guidance application display; and combine the guide shadow with the media guidance application display for display to the user.

11. The system of claim 10, wherein the control circuitry is further configured to:

detect a change in a position of the shadow of the media object; and update the stored object shadow information including the object shadow position to reflect the detected change in position.

12. The system of claim 10, wherein the control circuitry is further configured to select the media guidance application display by:

identifying a media guidance function corresponding to the user request; and retrieving one of a plurality of media guidance application displays that corresponds to the identified function.

13. The system of claim 10, wherein the media guidance application display comprises a plurality of media listings.

14. The system of claim 10, wherein the control circuitry is further configured to generate a simultaneous display of the media object with the shadow and the combined guide shadow with the media guidance application display, wherein the guide shadow appears at a same angle as the shadow of the media object.

15. The system of claim 10, wherein the control circuitry is further configured to dynamically adjust the guide shadow based on changes in the shadow of the object as playback of the media asset progresses.

16. The system of claim 10, wherein the media asset is a video and the media object is a character or landscape in the video.

17. The system of claim 10, wherein the control circuitry is further configured to retrieve the stored object shadow information in response to receiving the user request.

18. The system of claim 10, wherein the control circuitry is further configured to receive information from a source of the media asset that identifies a position of the shadow of the object at a later play position than a current play position in the media asset, wherein the guide shadow combined with the media guidance application display is presented at the later play position.

* * * * *